US006967653B2

(12) United States Patent
Wittenbrink et al.

(10) Patent No.: US 6,967,653 B2
(45) Date of Patent: Nov. 22, 2005

(54) APPARATUS AND METHOD FOR SEMI-AUTOMATIC CLASSIFICATION OF VOLUME DATA

(75) Inventors: Craig M. Wittenbrink, Palo Alto, CA (US); Hans Wolters, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 190 days.

(21) Appl. No.: 10/386,705

(22) Filed: Mar. 13, 2003

(65) Prior Publication Data

US 2004/0179010 A1 Sep. 16, 2004

(51) Int. Cl.$^7$ .............................. G09G 5/22; G09G 5/00; G06T 11/00; G06K 9/00; G06F 3/00
(52) U.S. Cl. ...................... 345/440; 345/623; 345/424; 382/131; 715/848
(58) Field of Search .................................. 345/440–441

(56) References Cited

U.S. PATENT DOCUMENTS

| | | | |
|---|---|---|---|
| 4,922,543 A | * | 5/1990 | Ahlbom et al. ............. 382/291 |
| 5,570,460 A | | 10/1996 | Ramanujan |
| 6,304,266 B1 | | 10/2001 | Li |
| 6,549,646 B1 | * | 4/2003 | Yeh et al. .................. 382/132 |
| 6,693,669 B1 | * | 2/2004 | Wu et al. ................... 348/254 |

OTHER PUBLICATIONS

Weszka, J.S., et al., "A treshold selection technique", IEEE Transactions on computers, Dec. 1974, pp. 1322–1326.
Panda, Durga P., et al., "Image segmentation by Pixel Classification in (Gray Level, Edge Value) Space", IEEE Transactions on computers, Oct. 31, 1977, pp. 875–879.
Fang, Shiaofen, et al., "Image–based transfer function design for data exploration in volume visualization", Proceedings Visualization '98, Oct. 18–23, 1998, pp. 319–326.
Kindlmann, Gordon, et al., "Semi–automatic generation of transfer functions for direct volume rendering", IEEE Symposium on volume visualization, Oct. 19–20, 1998.

* cited by examiner

*Primary Examiner*—Sumati Lefkowitz
*Assistant Examiner*—Eric V Woods

(57) ABSTRACT

An apparatus for semiautomatic classification of volume data provides the ability to generate visually significant representations of the important regions of the data set. The representations may be indicated by opacity or color changes, for example. The apparatus comprises programming to compute a two-dimensional (2D) histogram over a volume of scalar values, $f$, versus edge values edge( ). A common edge value is the gradient magnitude, edge$(\ )=|\nabla f|$.

16 Claims, 5 Drawing Sheets

APPARATUS AND METHOD FOR SEMI-AUTOMATIC CLASSIFICATION OF VOLUME DATA

TECHNICAL FIELD

The technical field is regular and irregular grid volume (three-dimensional) data rendering.

BACKGROUND

Volume rendering is often used in computer graphics applications where three-dimensional data need to be visualized. The volume data can be scans of physical or medical objects, or atmospheric, geophysical, or other scientific models where visualization of the data facilitates an understanding of the underlying real-world structures represented by the data.

With volume rendering, the internal structure, as well as the external surface features of physical objects and models are visualized. Voxels are usually the fundamental data items used in volume rendering. A voxel is a data item that represents a particular three-dimensional portion of the object or model. The coordinates (x, y, z) of each voxel map the voxels to positions within the represented object or model.

A voxel represents some particular intensity value of the object or model. For a given volume, intensity values can be physical parameters, such as, density, tissue type, elasticity, velocity, to name but a few. During rendering, the voxel values are converted to color and opacity (rgba) values, which can be projected onto a two-dimensional image plane for viewing. Distance ordering and opacity values are used to composite multiple voxel values that project onto the same image location (pixel), A number of different projection techniques are in common use, including ray tracing, splatting, and polygonal rendering.

Illumination is well known in both art and computer graphics for increasing the realism of an image by adding highlights, reflections, and shadows, thereby appealing to one of the natural capabilities of the human eye to recognize three-dimensional objects. A number of prior art illumination techniques are known in computer graphics, generally involving complex calculations among the directions to each of the light sources, normal vectors to surfaces, and the position of the viewer. In polygon graphics systems, where the three-dimensional objects are depicted by partitioning surfaces into many small triangles, the normal at each point on a surface is easily obtained from the specification of the triangle containing that point.

Volume rendering is also complicated because there are rarely any defined surfaces in a volume data set. Instead, visible surfaces must be inferred from the data itself. One technique is to calculate gradients throughout the volume data set, that is the rates and directions of change of the voxel values with respect to position. At points where the gradient is strong, a surface or boundary between material types can be inferred, with the gradient pointing in the direction tangential to the normal of the surface. The magnitude of the gradient indicates the sharpness of the surface. Traditional techniques are then applied to modulate the color intensity and opacity values according to both the magnitude and direction of the gradient at each point in the volume. By this method, features which exhibit high gradient magnitudes are accentuated as surfaces, while features which exhibit low gradient magnitudes are suppressed.

SUMMARY

What is disclosed is an apparatus for semi-automatic classification of volume data including a histogram module that generates two-dimensional histograms of the data. The apparatus also includes a gradient estimator that computes gradients for the data and a module that computes average and median edge values based on the computed gradients. Finally, a threshold module applies a threshold setting to the average and the median edge values.

Also disclosed is a method, corresponding to the apparatus described above, for semi-automatic classification of volume data. The method comprises the steps of receiving the volume data, computing a 2D histogram from the volume data, and computing average, $avg(edge_{hist}(f))$, and median edge values, $med(edge_{hist}(f))$, based on the two-dimensional histogram. Next a transfer function is produced by rescaling the edge values, and a threshold is applied to the transfer function.

Finally, what is disclosed is a method for computing a gradient at a data point in a three-dimensional data set. The method includes the steps of choosing a vertex data point, computing 1-ring data points, computing 2-ring data points, and assigning the vertex data point and the 1-ring and the 2-ring data points to a region, where data points in the three-dimensional volume data set may be assigned to regions.

DESCRIPTION OF THE DRAWINGS

The detailed description will refer to the following figures, in which like numbers refer to like elements, and in which.

DETAILED DESCRIPTION

Figure 1:
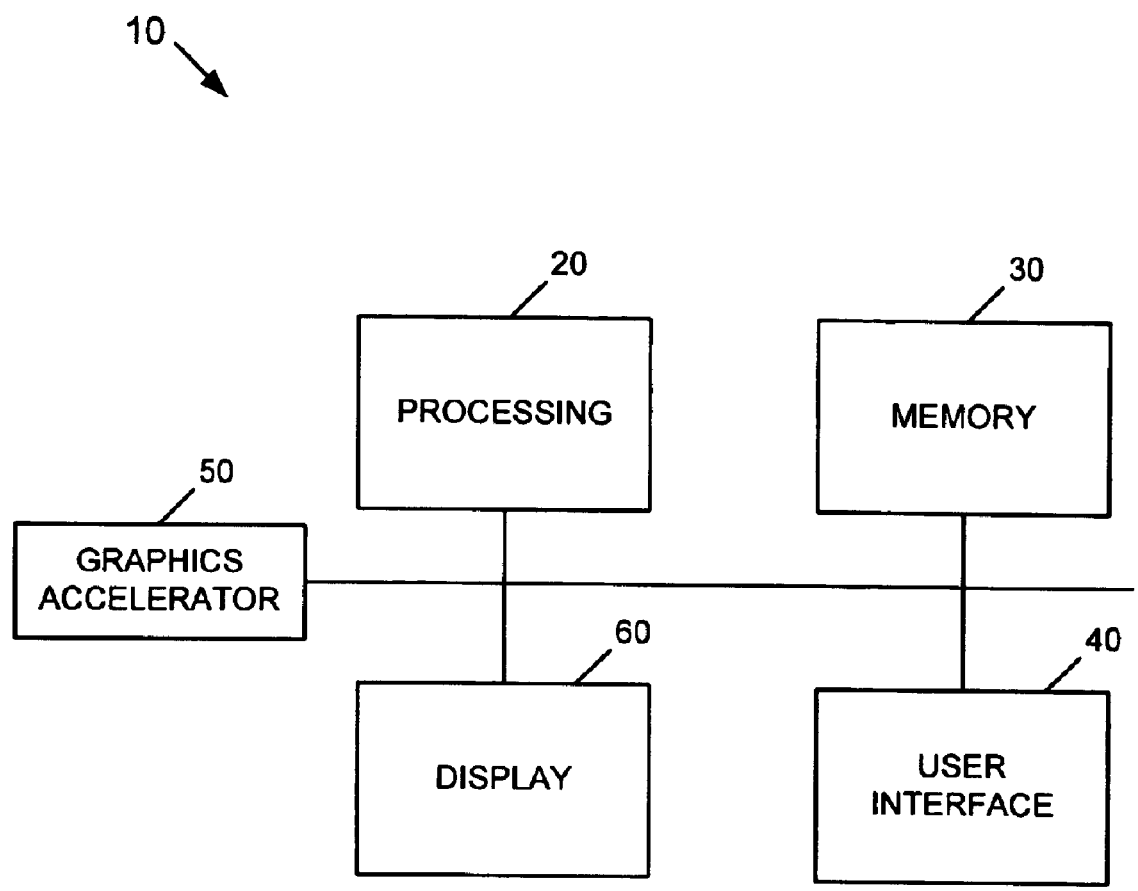
FIG. 1 is a diagram of a computer system architecture for rendering 3-dimensional models of objects.

A volumetric, or three-dimensional, data set may be used to describe a physical environment and time and/or spatially varying parameters in the physical environment. The volume data in the data set may be structured or unstructured.

Many physical situations are best described by measuring parameters in three-dimensions. Three-dimensional, or volume data, such as data that describe airflow over a wing may be easily measured, but difficult to interpret. That is, a human observer may experience difficulty interpreting the data set and visualizing important regions defined by the data set. Such regions may include boundaries between objects and background in the physical environment, and regions, or planes of constant, or near-constant parameter values. Further, such volume data may be regular or irregular, and irregular volume data may be harder to interpret than regular volume data. Typical of regular volume data is medical data, which can be ordered according to a regularly spaced grid. Typical of irregular grid data is airflow data from a wind tunnel simulation. Such airflow data is typically simulated at different points of the volume enclosing a body in the wind tunnel.

Pressure data such as may be recorded in the wind tunnel simulation may make little sense to a human observer without some means for presenting the volume data in a way that is conceptually easy to interpret. The process of rendering volume data into an easily interpretable format is known as classification. Classification relies on the use of transfer, or classification, functions to make the volume data "visible" by assigning renderable optical properties to the numerical values that comprise the volume data. Classification functions may be used to assign visual properties such as opacity, color, and emittance. For example, to classify volume data using opacity to represent regions of constant values, the volume data may be passed through an opacity classification function. The opacity classification function makes opaque those data values that correspond, across the entire volume, to features of interest.

Generating a visual display of the three-dimensional data can be a very time consuming process. In particular, the user may be required to adjust several different parameters in order to generate a meaningful display corresponding to the three-dimensional data set. The complexity of classification, particularly with large data sets, has led to a desire to produce automatic classifiers. However, such an automatic classifier may be very complex and calculation intensive.

As noted above, irregular volume data, such as data from a wind tunnel simulation, add to the difficulty of classification. To enhance the classification of such volume data, an apparatus and corresponding method for semi-automatic classification of regular and irregular volume (three-dimensional) data are disclosed. The method and apparatus allow a user to interact with the volume data in a way that enhances data perception and display.

To generate the classification functions, in prior art methods, a three-dimensional histogram is computed in scalar value, first derivative, and second derivative. Opacity functions of scalar value, and scalar value and first derivative magnitude, are generated using several user-controlled parameters. A boundary emphasis function is specified by the user, as well as a threshold below which derived values are not considered. Another user interaction is a simple modification of the resulting classification functions, either smoothing, zeroing, or adjusting to achieve desired results.

In an embodiment of the present method for semi-automatic classification of volume data, the user provides the threshold value t. In image processing, a goal is segmentation of an object from its background. A suitable threshold between the modes of the intensity histogram can create a binary classification. With noise and variable object size, threshold selection may be difficult. However, the gradient magnitude provides a means for distinguishing pixels in interior areas of an object from areas of edges. When object interior areas are isolated, the boundary pixels may be removed for image segmentation. This step may be accomplished by using a 2D histogram of edge value versus gray level. The edge value may be computed by a gradient magnitude or a related operator.

The volume data, either measured or simulated, may be referred to as a data set of scalar values, where each measured or simulated data point is represented as a discrete scalar value $f$. Moving from one data point to a neighboring data point may show a change in the scalar value. That is, moving from data point $p_1$ to data point $P_2$, a difference $\Delta f$ may be observed. A large enough value of the difference magnitude may represent an "edge" or boundary in the volume data. Such an edge may be used to better visualize the data. That is, identification of the edges in the volume data set can be used to provide a visual representation of the data so that the data may be more easily interpreted by a human observer. As a further step in creating a data visualization tool, a histogram of all the scalar values $f$ in the data set may be constructed.

According to an embodiment of the disclosed classification method, neither an edge position p( ) nor a spread function b( ) is specified. Only a 2D histogram is needed. The steps are:
1. Compute a 2D histogram over volume of scalar value, $f$ versus edge value edge( ). A common edge value is the gradient magnitude, edge ( )=$|\nabla f|$.
2. Compute an average, avg(edge$_{hist}$($f$)), and median edge values, med(edge$_{hist}$($f$)), for each scalar value.
3. Rescale the average and median edge values in the range 0 to 1, while thresholding to zero (0) when a value is below a threshold value t, rescale(avg($f$)).

After steps 1–3, the volume data may be rendered using the classification function generated in step 3.

FIG. 1 shows a computer system 10 for processing and rendering volume data. The system 10 includes a processor section 20, which may comprise one or more central processing units. The processor section 20 may include a rendering engine, and a semi-automatic classifier, as well as other software required to render the volume data. The rendering engine and semi-automatic classifier will be described in more detail with reference to FIG. 2. Also included in the system 10 is a main memory 30 that stores the volume data pre- and post-processing, a user interface 40 that allows a user to interact with the volume data, a graphics accelerator 50 to enhance display of the rendered volume data, and a display 60 that displays the rendered volume data for interpretation and review by the user.

Figure 2:
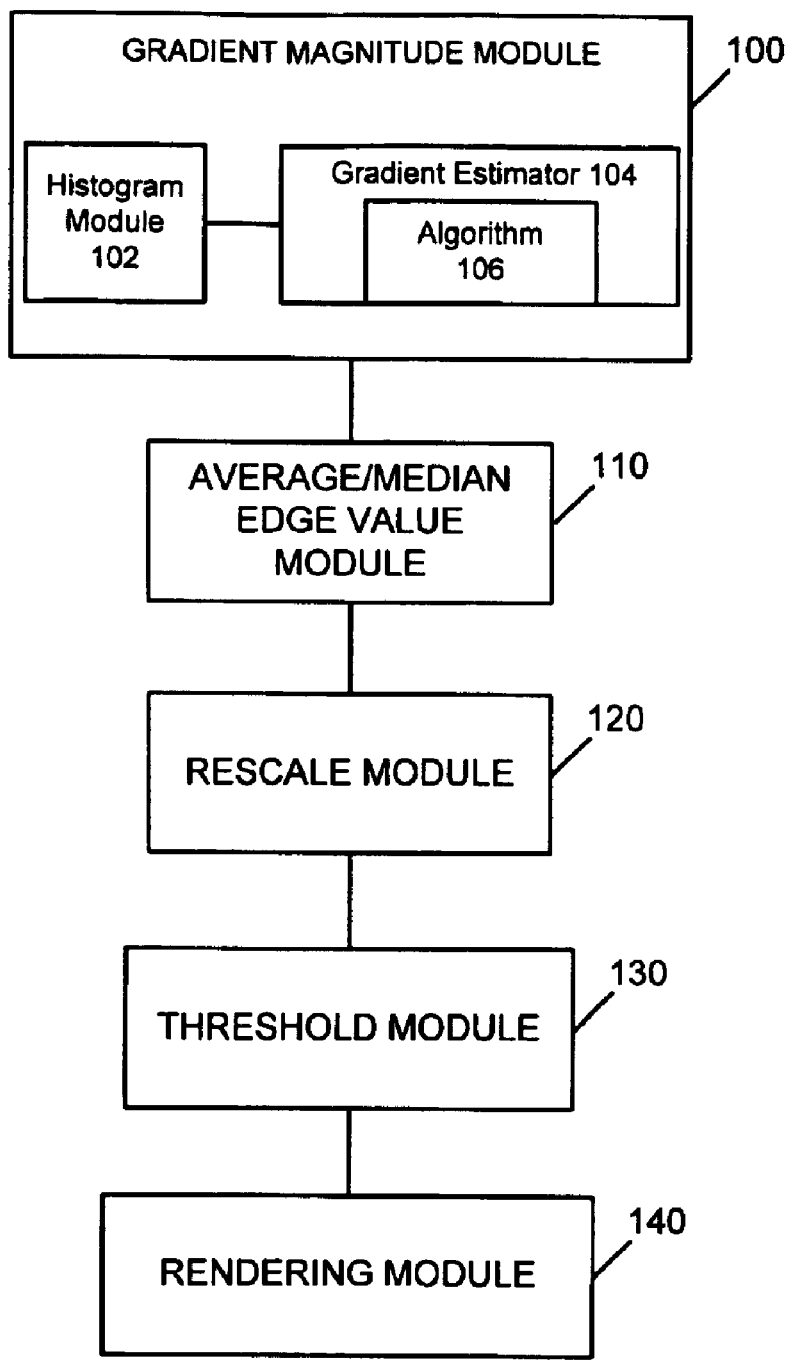
FIG. 2 is a block diagram of an apparatus for semi-automatic classification of volume data.

FIG. 2 illustrates one embodiment of an apparatus for rendering and semi-automatic classification of the volume data. In this embodiment, a gradient is used to compute an edge function. A number of different gradients may be used in computing the edge function. In addition, means other than a gradient may be used to compute the edge function. A gradient magnitude module 100 receives pixel data p over a given region $R_j$ and estimates the gradients of the data. The gradient magnitude module 100 may comprise a histogram module 102 and a gradient estimator 104. The histogram module 102 constructs a 2D histogram using the volume data. The gradient estimator 104 receives pixel data for each data point in the volume data, and constructs regions of such data points. The gradient estimator 104 includes an algorithm 106 for estimating a gradient. One algorithm for estimating the gradient in an irregular grid involves computing a series of multiquadric interpolants $M_j(p)$ defined on $R_j$. The multiquadric may be of the form:

$$M(p) = \sum_{i=1}^{N} d_i \sqrt{\|p - p_i\|^2 + R^2} + a + bx + cy + dz, \ p = (x, y, z);$$

where $$M(p_i) = f_i$$

$$\sum_{i=1}^{N} d_i = 0$$

$$\sum_{i=1}^{N} d_i x_i = 0$$

$$\sum_{i=1}^{N} d_i y_i = 0$$

$$\sum_{i=1}^{N} d_i z_i = 0$$

The gradient of data point $p_i$ is estimated by computing $DM_j(p_i)$ where $p_i \in R_j$. For each vertex or data point, a list of incident vertices in the tetrahedrization is determined. This is equivalent to the 1-ring in mesh terminology. To increase size of the region, the gradient estimator 104 computes the 2-ring. That is, for each vertex in the 1-ring, the vertices that are incident to the 1-ring vertex are determined. The vertex $p_i$, and the 1-ring and 2-ring data points then comprise the region $R_j$. Based on the data points in the region $R_j$, the interpolating multiquadric $M(p)$ is computed. Then, for each data point that is in the region $R_j$, the gradient may be computed by computing the gradient of the multiquadric $M_j$ at that point.

Other gradient estimators may also be used with the present method and apparatus for semi-automatic classification of volume data. In the case of a regular grid with a unit cell of dimensional a, b, and c, the gradient may be estimated from the density function by taking central differences between the densities, $f(x_0,y_0,z_0)$, evaluated at points $$g_x = \frac{f(x_0+a, y_0 z_0) - f(x_0-a, y_0, z_0)}{2a}$$

$$g_y = \frac{f(x_0, y_0+b, z_0) - f(x_0, y_0-b, z_0)}{2b}$$

$$g_z = \frac{f(x_0, y_0, z_0+c) - f(x_0, y_0, z_0-c)}{2c}$$

The 2D histogram is supplied to an average/median edge value module 110, which computes average and median values. The average and median edge values are then supplied to a rescale module 120 that rescales the edge values to a normalized range, which may be, for example, 0 to 1. A threshold module 130 may receive a user-selected threshold value, and apply the thus-received threshold value to the rescaled average and median edge values. Any edge values falling below the threshold selected will be displayed as a zero value. Finally, the thresholded and rescaled average and median edge values are provided as a transfer function to a rendering module 140 that renders the volume data as an image on the display 60.

Figure 3:
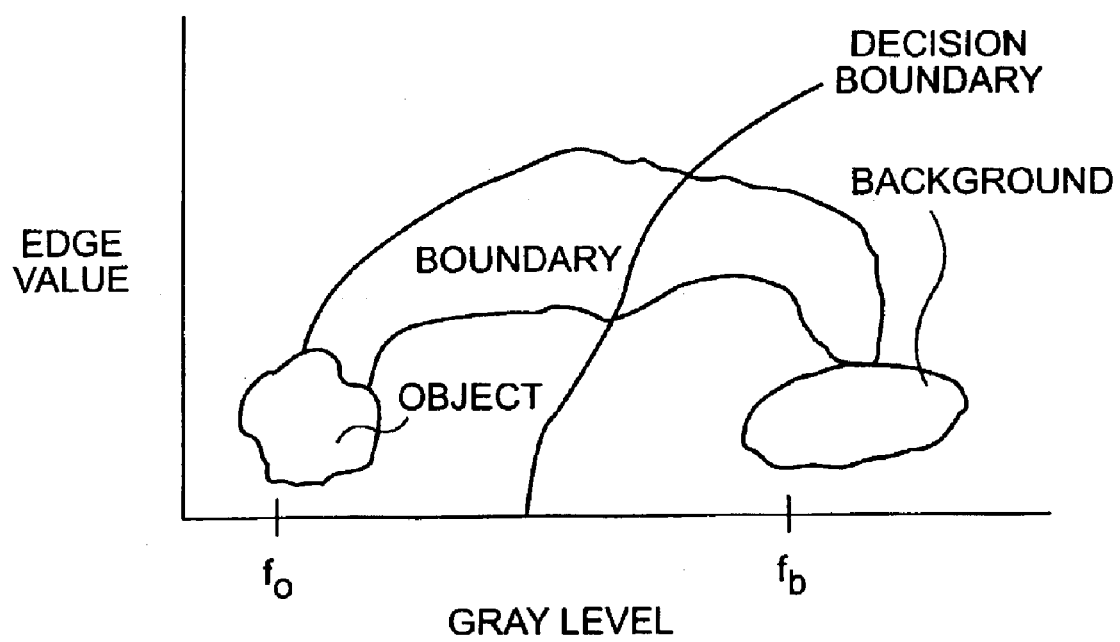
FIG. 3 illustrates a gray level of an image versus computed edge values.

FIG. 3 shows a gray level of an image on the horizontal axis and computed edge values on the vertical axis, as a range for a 2D histogram of values for the entire image. Different regions are demarcated as object, boundary, and background. If assumptions are made about such simple image content, then segmentation of the object from the background can be done by selecting a threshold t in the gray level that bisects the boundary pixels and that clearly separates the object and the background pixels. For example, the threshold t may be set at 15 (out of 255). Note that the transfer function will be recorded as a zero value when the transfer function drops below the threshold t.

Figure 4:
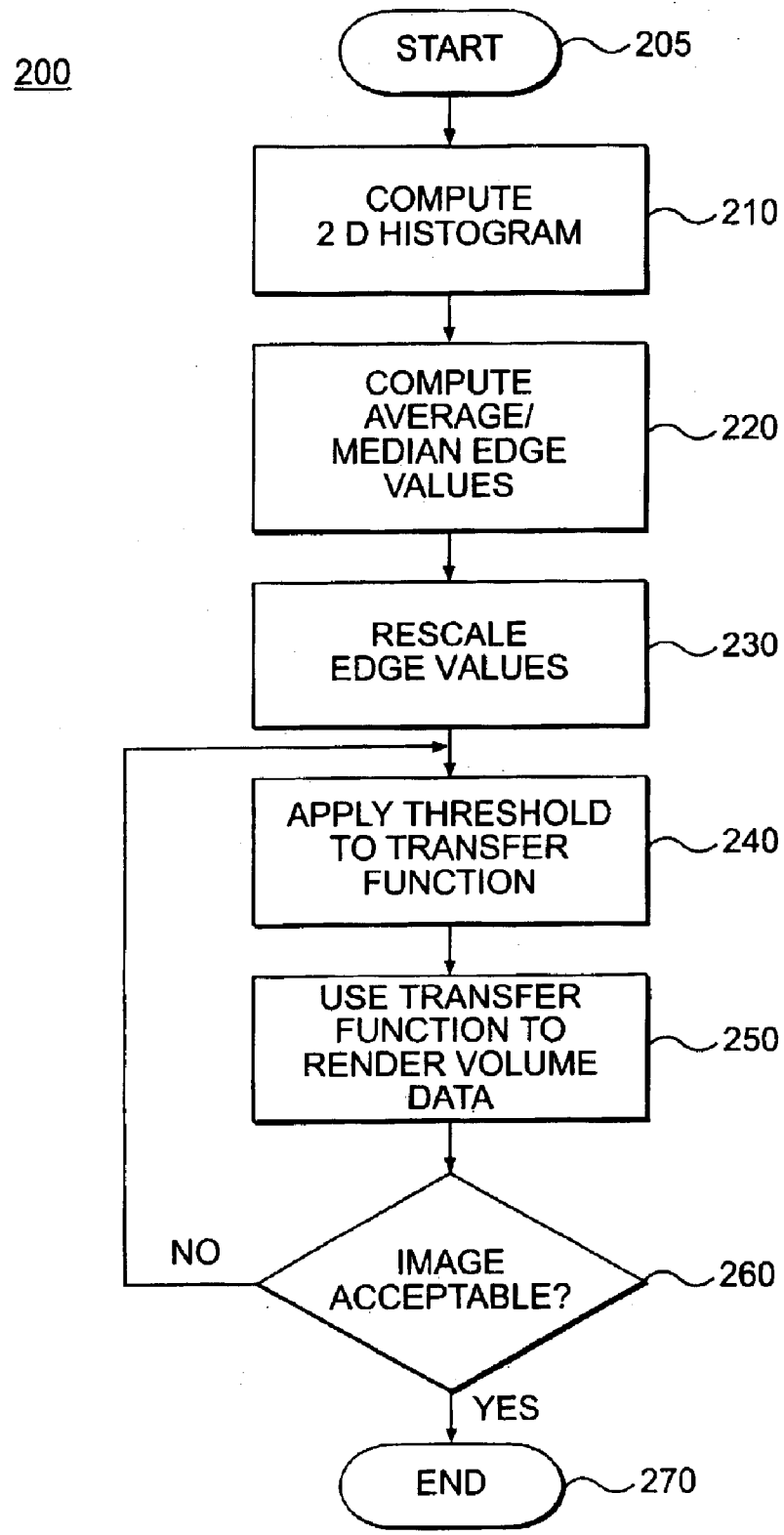
FIG. 4 is a flow chart illustrating a method of semi-automatic classification of volume data according to an embodiment.

FIG. 4 is a flow chart illustrating a method 200 for semi-automatic classification of volume data. The method begins with block 205. In block 210, a 2D histogram over a volume of scalar value, $f$, versus an edge value, edge( ) is computed. A common edge value is the gradient magnitude edge( )=$|\nabla f|$. The process for computing the gradient magnitude will be described in more detail with respect to FIG. 5. In block 220, average and median edge values are computed (i.e., compute avg(edge$_{hist}(f)$), and median edge values, med(edge$_{hist}(f)$)). In block 230, the average and median edge values are rescaled. For example, the average and median edge values may be rescaled to the range 0 to 1. In block, a user selects a threshold value, t. For example, the user may select the threshold value of t=15 (out of 255) gray scale values. The threshold t is then applied to a transfer function. Any rescaled average or median edge values that are less than the threshold value are set to zero. In block 250, the transfer function is used to render the volume data. In block 260, the user determines if the thus-rendered data provide an acceptable "image." If the user is satisfied with the rendered volume data, the process 200 moves to block 270 and ends. Otherwise, the process 200 returns to block 240, and the user selects another value for the threshold value, t. The process 200 then continues.

Figure 5:
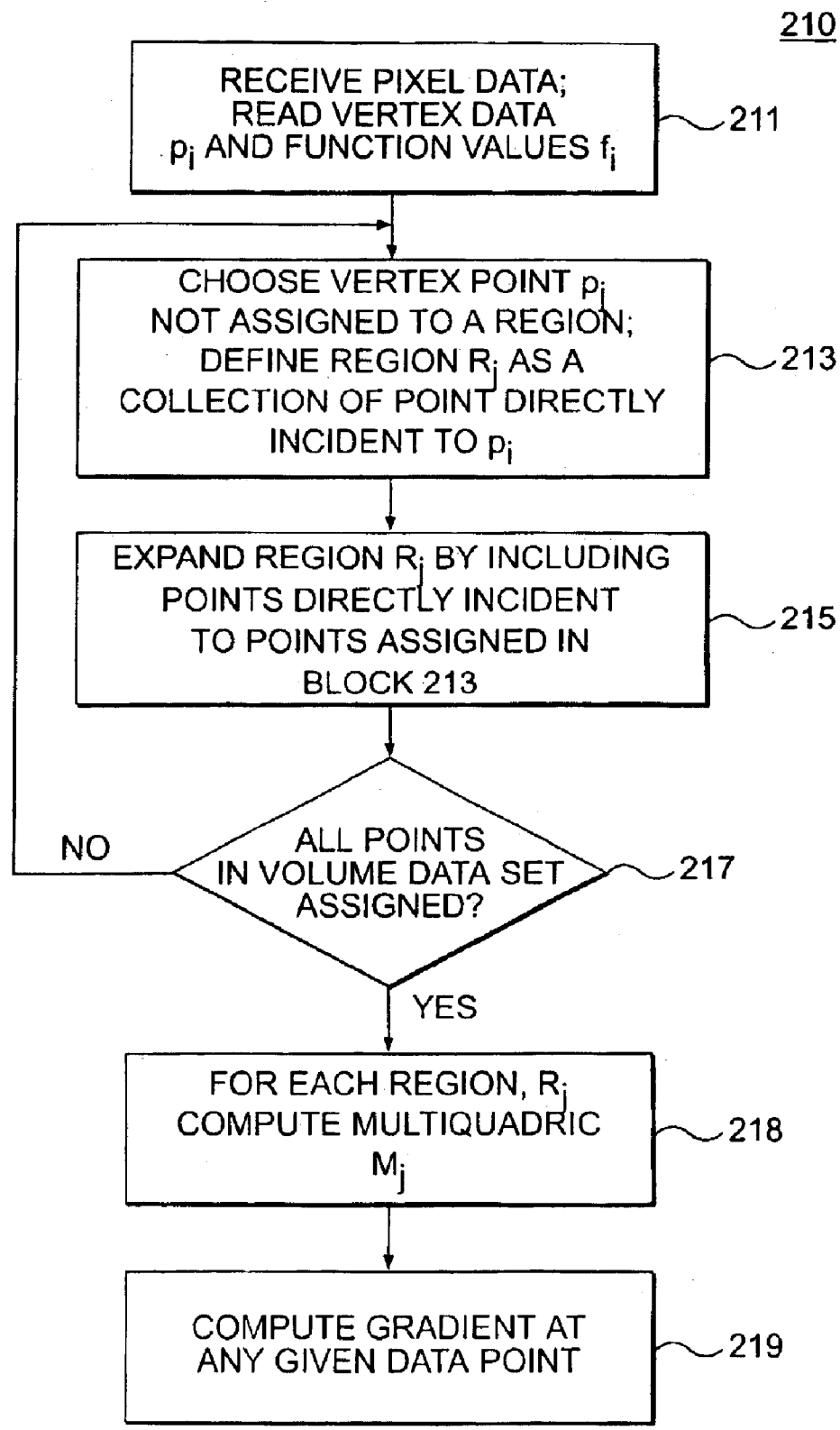
FIG. 5 is a flow chart illustrating a subroutine for computing a 2D histogram.

FIG. 5 is a flowchart showing the subroutine 210 for computing the 2D histogram, including an embodiment of a process for computing the gradient magnitude. The subroutine 210 is a sample implementation for an irregular grid. The method varies depending on the gradient estimator used with the method. In block 211, pixel data is received to allow a multiquadric to be computed. The multiquadric may be of the form shown in Equation 1 with $R^2$ is set equal to one (1), and $M(p_i)=f_i$.

Here $p_i$ are the vertex data points and $f_i$ is a measurement taken at $p_i$. In the case of a regular grid, a different (simpler) gradient estimator, such as that described above, may be used. The step (block 211) of receiving the pixel data includes reading the vertex data $p_i$ and the function values $f_i$. In block 213, a vertex point $p_i$ not assigned to a region is chosen and a region $R_i$ is defined as a collection of data points that are directly incident to $p_i$. This is equivalent to the 1-ring in mesh terminology. In block 215, the size of a Region $R_j$ is increased by including data points that are directly incident to the data points in the 1-ring. Thus, the region $R_j$ includes the vertex data point, and data points in the 1-ring and the 2-ring. In block 217, all other data points in the data set are examined to determine if such other data points are assigned to regions. If a data point is not assigned to a region, the subroutine 210 returns to block 213, and the data point is assigned to a region $R_j$. The subroutine then continues with blocks 215 and 217 until all pixel data points are assigned to a region. After all regions $R_k$ have been determined, the multiquadrics $M_k$ are determined, block 218. The multiquadric $M_j$ is computed so as to interpolate the data points that belong to the Region $R_j$. Then, for each data point that is in the region, the gradient is computed by computing the gradient of the multiquadric at that point, block 219. The subroutine 210 then ends, and the process 200 continues with block 220.

What is claimed is:

1. An computer-implemented apparatus for semi-automatic classification of volume data, comprising:
   a histogram module that generates two-dimensional histograms of the data;
   a gradient estimator that computes gradients for the data; said gradients being computed according to a multiquadric:

$$M(p) = \sum_{i=1}^{N} d_i \sqrt{\|p - p_i\|^2 + R^2} + a + bx + cy + dz, \, p = (x, y, z);$$

where $$M(p_i) = f_i$$

$$\sum_{i=1}^{N} d_i = 0$$

$$\sum_{i=1}^{N} d_i x_i = 0$$

$$\sum_{i=1}^{N} d_i y_i = 0$$

$$\sum_{i=1}^{N} d_i z_i = 0,$$

wherein the volume of data comprises a plurality of regions $R_j$, and wherein a multiquadric $M_j$ may be computed for each of the plurality of regions $R_j$;
   a module that computes average and median edge values based on the computed gradients; and a threshold module that applies a threshold setting to the average and median edge values to enable rendering of the volume data in a human interpretable format on a display device.

2. The apparatus of claim 1, further comprising a rescale module that rescales the computed average and median edge values.

3. The apparatus of claim 2, wherein the threshold setting is applied to the rescaled edge values.

4. The apparatus of claim 2, wherein the rescaling is based on a user-selected rescale range.

5. The apparatus of claim 1, wherein the threshold setting is user-selected.

6. The apparatus of claim 1, wherein application of the threshold setting renders edge values below the threshold setting at zero.

7. The apparatus of claim 1, further comprising a rendering module that renders the data for display.

8. The apparatus of claim 1, wherein the gradient estimator comprises:
   means for choosing a vertex data point;
   means for choosing 1-ring data points incident to the vertex data point;
   means for expanding the chosen data points to include additional data points in a 2-ring; and
   means for assigning the chosen vertex data point, and the 1-ring and the 2-ring data points to a region.

9. An computor-implemented apparatus for semi-automatic classification of volume data, comprising:
   a histogram module that generates two-dimensional histograms of the data;
   a gradient estimator that computes gradients for the data, said gradients being computed as according to $$g_x = \frac{f(x_0 + a, y_0 z_0) - f(x_0 - a, y_0, z_0)}{2a}$$
$$g_y = \frac{f(x_0, y_0 + b, z_0) - f(x_0, y_0 - b, z_0)}{2b}$$
$$g_z = \frac{f(x_0, y_0, z_0 + c) - f(x_0, y_0, z_0 - c)}{2c};$$

a module that computes average and median edge values based on the computed gradients; and
   a threshold module that applies a threshold setting to the average and median edge values to enable rendering of the volume data in a human interpretable format on a display device.

10. A computor-implemented method for semi-automatic classification of volume data, comprising:
    receiving the volume data;
    computing a two-dimensional histogram from the volume data;
    computing average and median edge values based on the two-dimensional histogram and by computing gradient values using a multiquadric of the form $$M(p) = \sum_{i=1}^{N} d_i \sqrt{\|p - p_i\|^2 + R^2} + a + bx + cy + dz, \, p = (x, y, z);$$

where
$$M(p_i) = f_i$$

$$\sum_{i=1}^{N} d_i = 0$$
$$\sum_{i=1}^{N} d_i x_i = 0$$
$$\sum_{i=1}^{N} d_i y_i = 0$$
$$\sum_{i=1}^{N} d_i z_i = 0;$$

rescaling the edge values to produce rescaled average and median edge values to produce a transfer function; and
applying a threshold to the transfer function to enable rendering of the volume data in a human interpretable format on a display device.

11. The method of claim 10, wherein the threshold is a user-selected value.

12. The method of claim 10, further comprising rendering the volume data using the thresholded transfer function.

13. The method of claim 10, wherein computing the gradient values comprises:
    choosing a vertex data point;
    computing 1-ring data points;
    computing 2-ring data points; and
    assigning the vertex data point and the 1-ring and the 2-ring data points to a region.

14. A computor-implemented method for semi-automatic classification of volume data, comprising:
    receiving the volume data;
    computing a two-dimensional histogram from the volume data;
    computing average and median edge values based on the two-dimensional histogram and by computing gradient values in accordance with:

$$g_x = \frac{f(x_0 + a, y_0 z_0) - f(x_0 - a, y_0, z_0)}{2a}$$
$$g_y = \frac{f(x_0, y_0 + b, z_0) - f(x_0, y_0 - b, z_0)}{2b}$$
$$g_z = \frac{f(x_0, y_0, z_0 + c) - f(x_0, y_0, z_0 - c)}{2c};$$

rescaling the edge values to produce rescaled average and median edge values to produce a transfer function; and
applying a threshold to the transfer function to enable rendering of the volume data in a human interpretable format on a display device.

15. A computor-implemented method for computing a gradient at a data point in a three-dimensional data set, comprising:
    choosing a vertex data point;
    computing 1-ring data points;
    computing 2-ring data points; and
    assigning the vertex data point and the 1-ring and the 2-ring data points to a region, wherein data points in the three-dimensional volume data set may be assigned to regions and wherein for each region, computing a multiquadric that interpolates data points assigned to the region to enable rendering of the volume data in a human interpretable format on a display device.

16. A computor-implemented method for semiautomatic classification of volume data, comprising:

computing a two-dimensional histogram over the volume data;

computing average and median edge values based on the histogram and by computing gradient values using a multiquadric of the form $$M(p) = \sum_{i=1}^{N} d_i \sqrt{\|p - p_i\|^2 + R^2} + a + bx + cy + dz, \ p = (x, y, z);$$

where $$M(p_i) = f_i$$

$$\sum_{i=1}^{N} d_i = 0$$

$$\sum_{i=1}^{N} d_i x_i = 0$$

$$\sum_{i=1}^{N} d_i y_i = 0$$

$$\sum_{i=1}^{N} d_i z_i = 0;$$

generating a threshold transfer function to enable rendering of the volume data in a human interpretable format on a display device, said generating comprising:

rescaling the edge values, and applying a threshold to the rescaled edge values.

* * * * *